US012573513B2

(12) United States Patent
Wandrey

(10) Patent No.: US 12,573,513 B2
(45) Date of Patent: Mar. 10, 2026

(54) PROCESS AND TOOLS TO PERFORM REACTOR PRESSURE VESSEL NOZZLE EXPANSION MITIGATING PRIMARY COOLANT LEAKAGE

(71) Applicant: GE-Hitachi Nuclear Energy Americas LLC, Wilmington, NC (US)

(72) Inventor: Kenneth A. Wandrey, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 210 days.

(21) Appl. No.: 17/836,396

(22) Filed: Jun. 9, 2022

(65) Prior Publication Data

US 2023/0402198 A1 Dec. 14, 2023

(51) Int. Cl.
*G21C 17/017* (2006.01)
*B21D 41/02* (2006.01)
*G21C 13/032* (2006.01)

(52) U.S. Cl.
CPC ......... *G21C 17/017* (2013.01); *B21D 41/023* (2013.01); *G21C 13/032* (2013.01)

(58) Field of Classification Search
CPC .. B21D 41/023; B21D 41/025; B21D 41/026; B21D 41/028; B21D 41/02; G21C 17/017; G21C 13/032; G21C 17/01
USPC ........................................................... 72/393
See application file for complete search history.

(56) References Cited

U.S. PATENT DOCUMENTS

| | | | | | |
|---|---|---|---|---|---|
| 2,772,716 | A * | 12/1956 | Stary | B21D 39/10 | 72/123 |
| 2,835,307 | A * | 5/1958 | Jorgensen | B21D 39/16 | 72/123 |
| 3,728,891 | A * | 4/1973 | Hall, Jr. | B21D 1/06 | 72/705 |
| 4,232,442 | A * | 11/1980 | Brunaud | B21D 39/10 | 72/122 |
| 4,530,231 | A * | 7/1985 | Main | B21D 41/02 | 72/393 |
| 4,682,725 | A | 7/1987 | Martin et al. | | |
| 4,876,871 | A * | 10/1989 | Arzenti | F28F 11/02 | 72/122 |

(Continued)

FOREIGN PATENT DOCUMENTS

| | | | |
|---|---|---|---|
| CN | 113231554 | A | 8/2021 |
| CN | 113953395 | A | 1/2022 |

(Continued)

OTHER PUBLICATIONS

JP 7-15128U, Japanese Mar. 1995.*

(Continued)

*Primary Examiner* — Edward T Tolan
(74) *Attorney, Agent, or Firm* — Harness, Dickey & Pierce, P.L.C.

(57) ABSTRACT

A nozzle expansion tool includes a frame with a drive system on the frame. A rotary mandrel is drivingly connected to the drive system and is engageable with an expansion roller device. A plurality of vacuum cups are mounted to the frame and each include a vacuum fitting adapted to be connected to a vacuum source. A depth adjustment mechanism is connected to the expansion roller device and is configured to adjust a distance that the expansion roller device extends from the frame.

15 Claims, 9 Drawing Sheets

(56) References Cited

U.S. PATENT DOCUMENTS

| | | | | |
|---|---|---|---|---|
| 5,305,361 A * | 4/1994 | Enomoto | B05B 15/62 | 134/1 |
| 5,443,201 A * | 8/1995 | Cartry | B23K 9/048 | 228/119 |
| 2011/0198075 A1 * | 8/2011 | Okada | F16L 55/28 | 166/170 |
| 2014/0305176 A1 * | 10/2014 | Aravindan | B21D 41/026 | 72/13.4 |

FOREIGN PATENT DOCUMENTS

| | | | |
|---|---|---|---|
| EP | 2696198 | A1 | 2/2014 |
| EP | 2772334 | A2 | 9/2014 |
| JP | 63252625 | A | 10/1988 |
| JP | H0715128 | U | 3/1995 |
| JP | 2006349596 | A | 12/2006 |
| JP | 2013517475 | A | 5/2013 |

OTHER PUBLICATIONS

CN 113953395A, Sawazaki et al. Jan. 2022.*
CN 113231554A, Jiang Aug. 2021.*
JP 63-252625A, Kishi Oct. 1988.*
International Search Report and Written Opinion dated Oct. 10, 2023 (corresponding to PCT/US2023/067958).
International Search Report and Written Opinion dated Dec. 10, 2024 (corresponding to PCT/US2023/067958).

* cited by examiner

PROCESS AND TOOLS TO PERFORM REACTOR PRESSURE VESSEL NOZZLE EXPANSION MITIGATING PRIMARY COOLANT LEAKAGE

BACKGROUND

Field

The present disclosure relates to a process and tools to perform reactor pressure vessel nozzle expansion mitigating primary coolant leakage.

Description of Related Art

This section provides background information related to the present disclosure which is not necessarily prior art.

The inlet nozzles of a reactor pressure vessel pass steam and hot water out of the reactor pressure vessel and experience high thermal variations during reactor operation. Due to the rapid changes in temperature and stress corrosion cracking at the welds that secure the nozzles the welds can experience cracks and, in some cases, leaks around the nozzle penetrations in a boiling water rector. Accordingly, it is desirable to provide an improved method and apparatus for sealing the nozzle penetrations.

SUMMARY

This section provides a general summary of the disclosure, and is not a comprehensive disclosure of its full scope or all of its features.

The present disclosure is directed to a tool and method for roll expansion of a nozzle in a reactor pressure vessel to mitigate a leak around the nozzle. Roll expansion of the nozzle is an effective and economic solution for sealing a leak in a nozzle of a reactor pressure vessel of a boiling water reactor and can be performed remotely from above the pressure reactor vessel and by using the tool under water.

According to an embodiment of the present disclosure, a nozzle expansion tool includes a frame with a drive system on the frame. A rotary mandrel is drivingly connected to the drive system and is engageable with an expansion roller device. A plurality of vacuum cups are mounted to the frame, and each include a vacuum fitting configured to be connected to a vacuum source.

According to an embodiment of the present disclosure, a depth adjustment mechanism is connected to the expansion roller device and is configured to adjust a distance that the expansion roller device extends from the frame.

According to yet another embodiment of the present disclosure, a method of repairing a crack in a nozzle in a reactor pressure vessel of a boiling water reactor includes suspending a nozzle expansion tool into the reactor pressure vessel. An expansion roller device of the nozzle expansion tool is aligned with an opening of the nozzle. A vacuum cup is supported by an extension system and is engaged with a wall of the reactor pressure vessel. The extension system is retracted to pull the expansion roller device into the nozzle, and a drive motor of the nozzle expansion tool is operated to rotate a rotary mandrel in engagement with the expansion roller device and expanding the nozzle.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
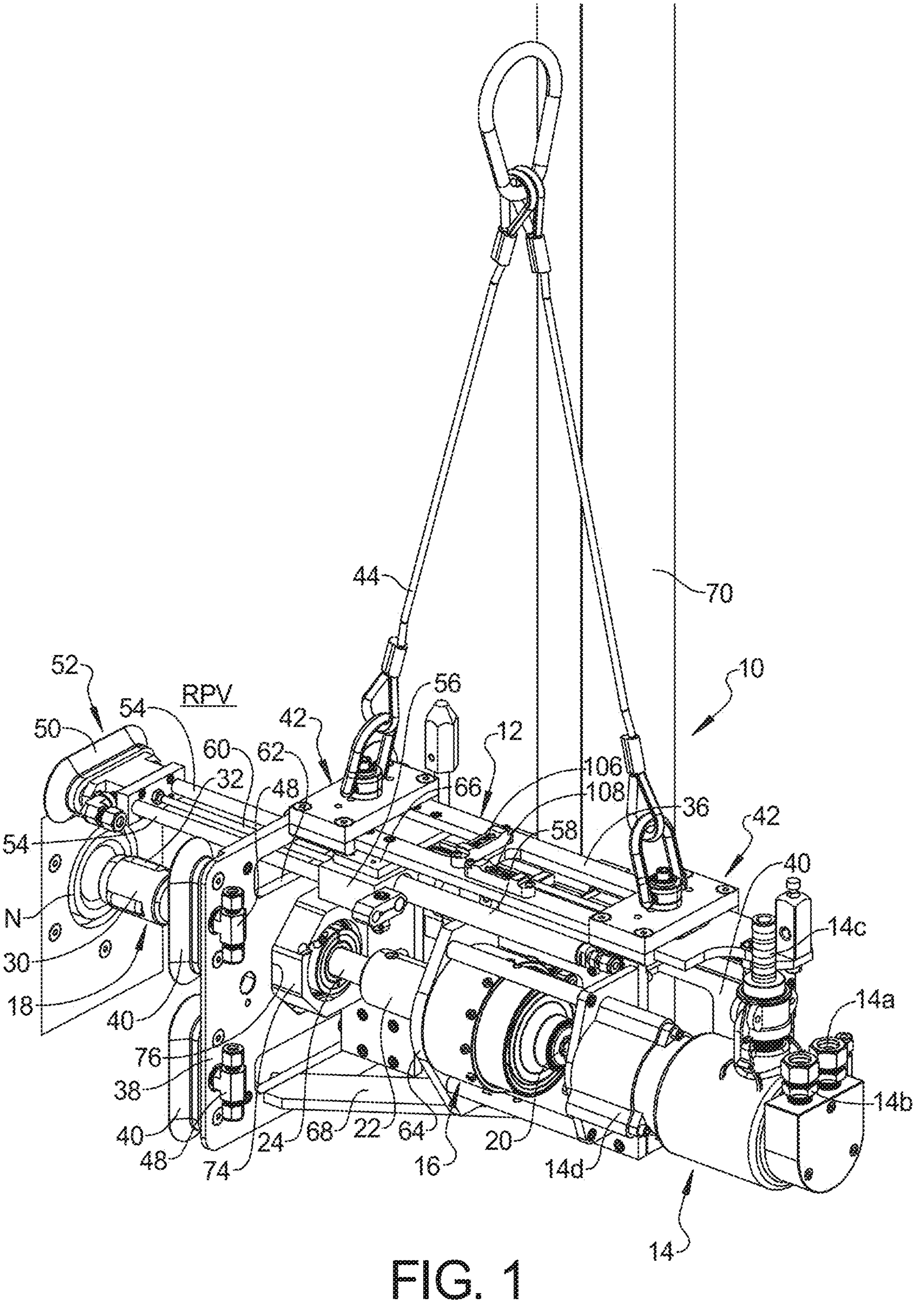
FIG. 1 is a rear side perspective view of a nozzle expansion tool being inserted into an opening of a nozzle of a boiling water reactor according to at least some embodiments.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being “on,” “engaged to,” “connected to,” or “coupled to” another element or layer, it may be directly on, engaged, connected or coupled to the other element or layer, or intervening elements or layers may be present. In contrast, when an element is referred to as being “directly on,” “directly engaged to,” “directly connected to,” or “directly coupled to” another element or layer, there may be no intervening elements or layers present. Other words used to describe the relationship between elements should be interpreted in a like fashion (e.g., “between” versus “directly between,” “adjacent” versus “directly adjacent,” etc.). As used herein, the term “and/or” includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer, or section from another region, layer, or section. Terms such as “first,” “second,” and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as “inner,” “outer,” “beneath,” “below,” “lower,” “above,” “upper,” and the like, may be used herein for ease of description to describe one element or feature’s relationship to another element(s) or feature(s) as illustrated in the figures. Spatially relative terms may be intended to encompass different orientations of the device in use or operation in addition to the orientation depicted in the figures. For example, if the device in the figures is turned over, elements described as “below” or “beneath” other elements or features would then be oriented “above” the other elements or features. Thus, the example term “below” can encompass both an orientation of above and below. The device may be otherwise oriented (rotated 90 degrees or at other orientations) and the spatially relative descriptors used herein interpreted accordingly.

Figure 2:
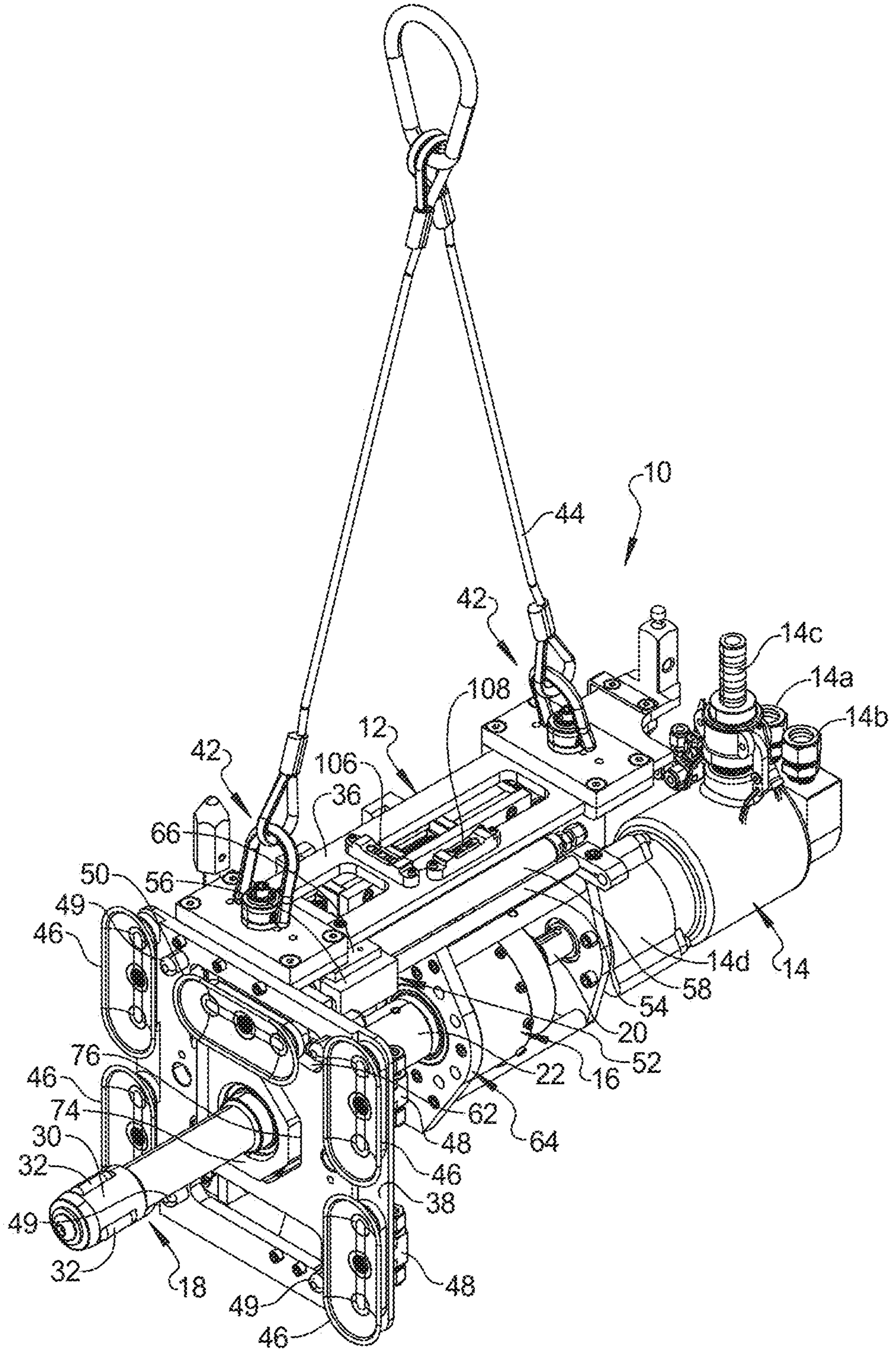
FIG. 2 is a front side perspective view of the nozzle expansion tool.
Figure 3:
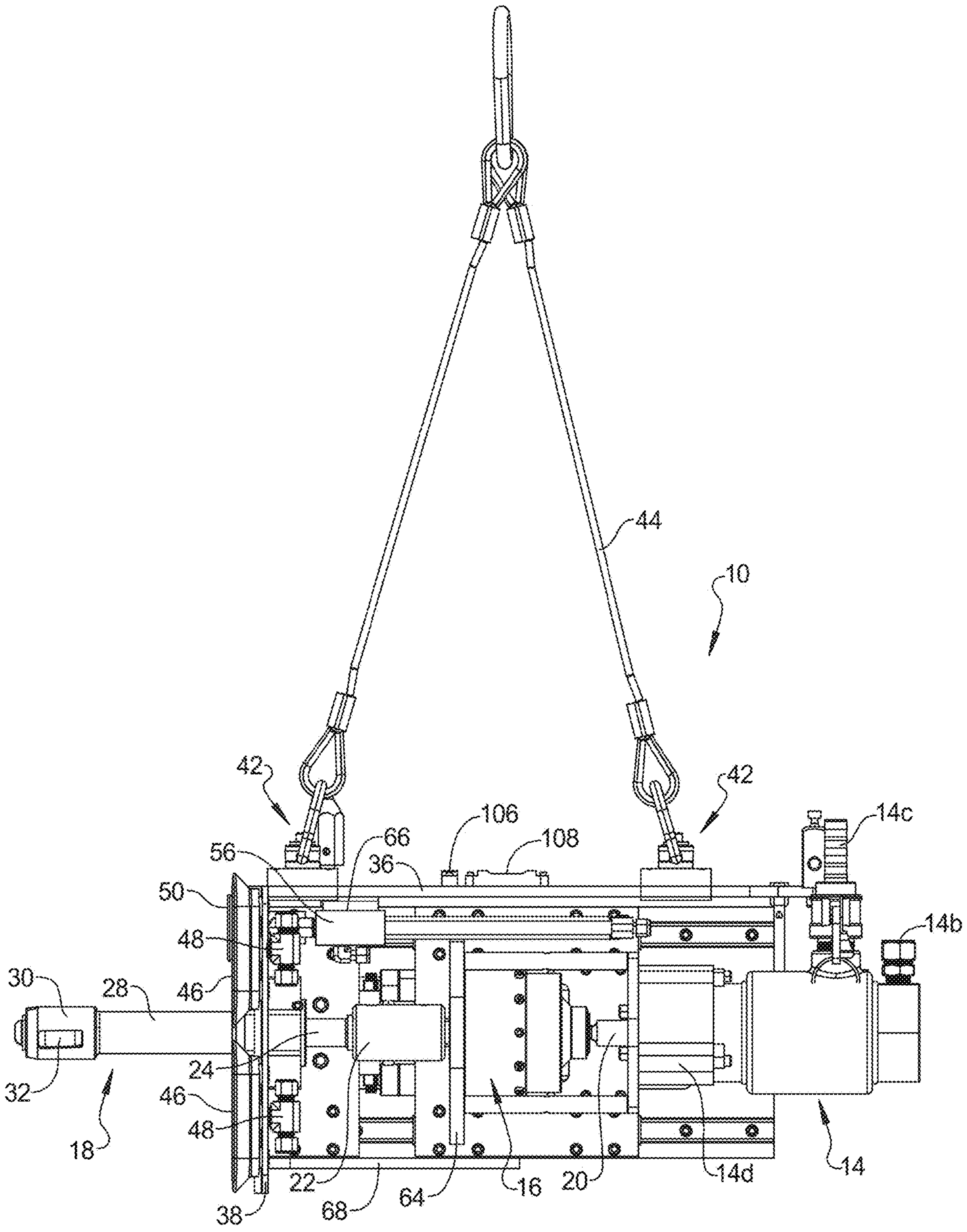
FIG. 3 is a left side plan view of the nozzle expansion tool.

With reference to FIG. 1, a nozzle expansion tool 10 is shown being inserted into an opening of a nozzle N of a reactor pressure vessel RPV according to the principles of the present disclosure. With reference to FIGS. 1-3, the nozzle expansion tool 10 includes a frame 12 that supports a drive motor 14, a planetary gearbox 16 and an expansion roller device 18. The drive motor 14 includes directional fluid inlet ports 14*a*, 14*b* (clockwise and counter-clockwise) and a fluid exhaust port 14*c* for driving the drive motor 14 in either a clockwise or a counter-clockwise direction. The drive motor 14 can be pneumatically or hydraulically driven and includes a drive shaft 20 that is connected to the planetary gearbox 16 for driving an output coupling 22 that is drivingly connected to a rotary mandrel 24 of the expansion roller device 18. The output coupling 22 includes internal splines that are connected to external splines on a gearbox output shaft 16*a* and on the mandrel 24. The drive motor 14 can optionally include a separate planetary gearbox 14*d*.

Figure 8:
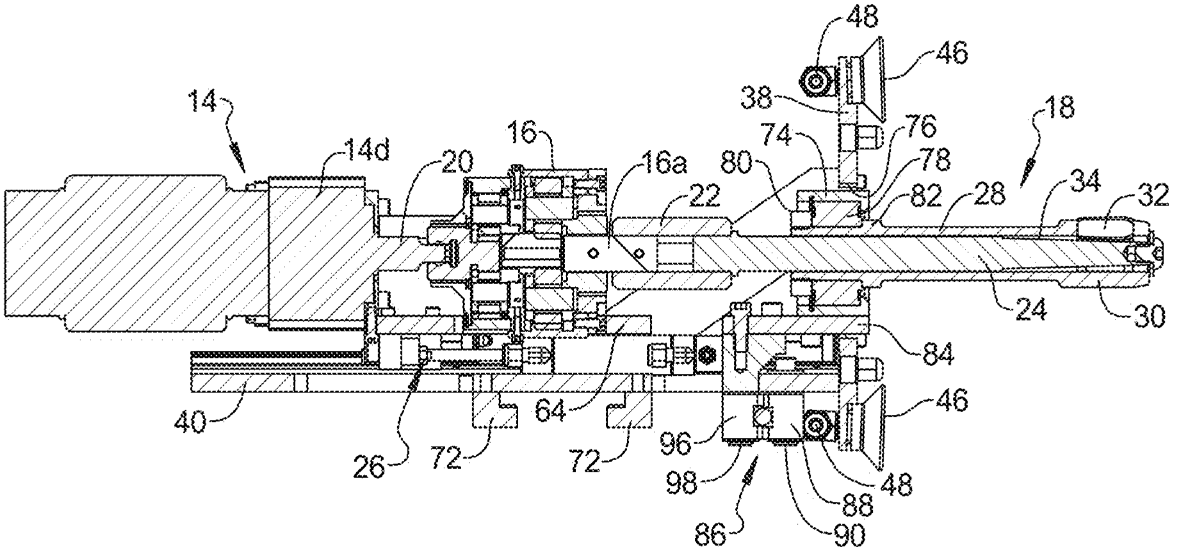
FIG. 8 is a cross-sectional view of the nozzle expansion tool taken along line 8-8 of FIG. 5.

With reference to FIG. 8, a linear actuator 26 is operable to move the drive motor 14, the planetary gearbox 16, the output coupling 22 and rotary mandrel 24 in a fore and aft direction relative to the frame 12, as will be described in further detail herein. The expansion roller device 18 includes an elongated sleeve 28 with an expansion head 30 that supports a plurality of expansion rollers 32. Expansion roller devices 18 of this type are generally known in the art. The rotary mandrel 24 includes a tapered exterior surface 34 that engages the expansion rollers 32 and when driven in a first expansion direction presses outward on the expansion rollers 32 and draws itself further inward (to the right as viewed in FIG. 8) between the expansion rollers 32 as the rotary mandrel 24 rotates. The expansion roller device 18 rotates along with the rotary mandrel 24 that causes the expansion rollers 32 to continue to expand radially outward for causing an expansion of a nozzle N for the purpose of leak mitigation. When the rotary mandrel 24 is rotated in an opposite direction, the rotary mandrel 24 tends to withdraw (leftward as viewed in FIG. 8) from the expansion rollers 32 so that the expansion rollers 32 can move radially inward away from contact with the wall of the nozzle N.

Figure 5:
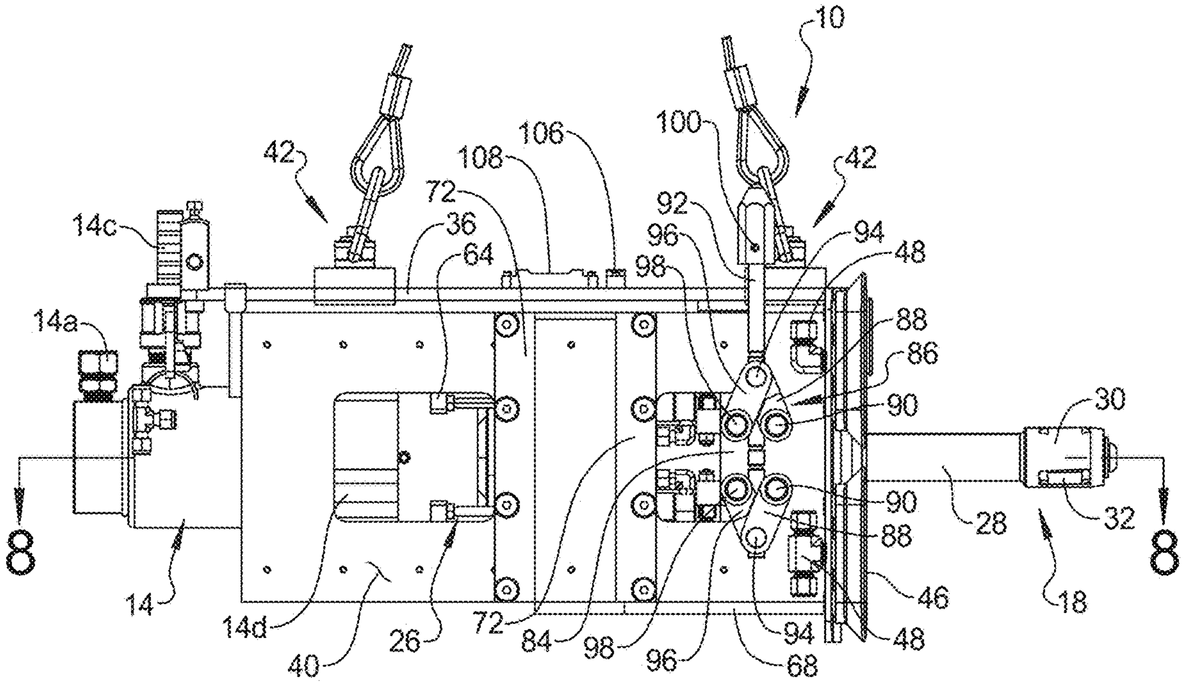
FIG. 5 is a right side plan view of the nozzle expansion tool with the tool head located in a fully extended position.

With reference to FIG. 1, the frame 12 includes a top frame member 36, a front frame member 38 and at least one side frame member 40 (best shown in FIG. 5). The top frame member 36 supports a pair of rigging modules 42 that each include a shackle that is engaged by a suspension cable 44.

The front frame member 38 supports a plurality of vacuum cups 46 that each include a vacuum fitting 48. In the embodiment shown, four vacuum cups 46 are provided, although more or fewer vacuum cups 46 can be provided. A plurality of bumper stops 49 are provided adjacent to a respective one of the vacuum cups 46 to limit an amount of depression of the vacuum cups 46.

An additional vacuum cup 50 is provided on the end of a tool locator mechanism 52. The vacuum cup 50 is supported by a pair of guide rods 54 that are slidably received by a guide block 56. The tool locator mechanism 52 includes a drive cylinder 58 and a drive piston 60 that can be activated to extend and retract the vacuum cup 50 and guide rods 54 away from and toward the front frame member 38, as shown in FIG. 1. The front frame member 38 includes an opening 62 through which the guide rods 54 and piston 60 extend.

The tool locator mechanism 52 can be extended in a forward direction to engage the vacuum cup 50 to the side wall of the reactor pressure vessel PRV. Vacuum pressure is applied to the fitting of vacuum cup 50 and the drive piston 60 is then drawn inward to pull the tool 10 toward the wall of the reactor pressure vessel PRV until the vacuum cups 46 engage the wall and to pull the expansion roller device 18 into the opening of the nozzle N. The vacuum cups 46, are supplied with a vacuum pressure via the fittings in order to secure and stabilize the tool 10 relative to the wall when the expansion roller device 18 is operated for expanding the nozzle N.

The frame 12 further includes a drive system support structure 64 that supports the hydraulic motor 14, the planetary gearbox 16, the output coupling 22 and the rotary mandrel 24 relative to the top frame member 36, the side frame member 40 and the front frame member 38. The drive system support structure 64 is moved in a fore and aft direction by the linear actuator 26 (in the form of an air cylinder drive), as shown in FIG. 8. The guide block 56 can also be supported by the top frame member 36, either directly or via an intermediate frame member 66. A cross brace member 68 can be provided between the side frame member 40 and the front frame member 38. It should be understood that additional frame members and support structure can be provided, as needed for supporting various components of the nozzle expansion tool 10.

Figure 4:
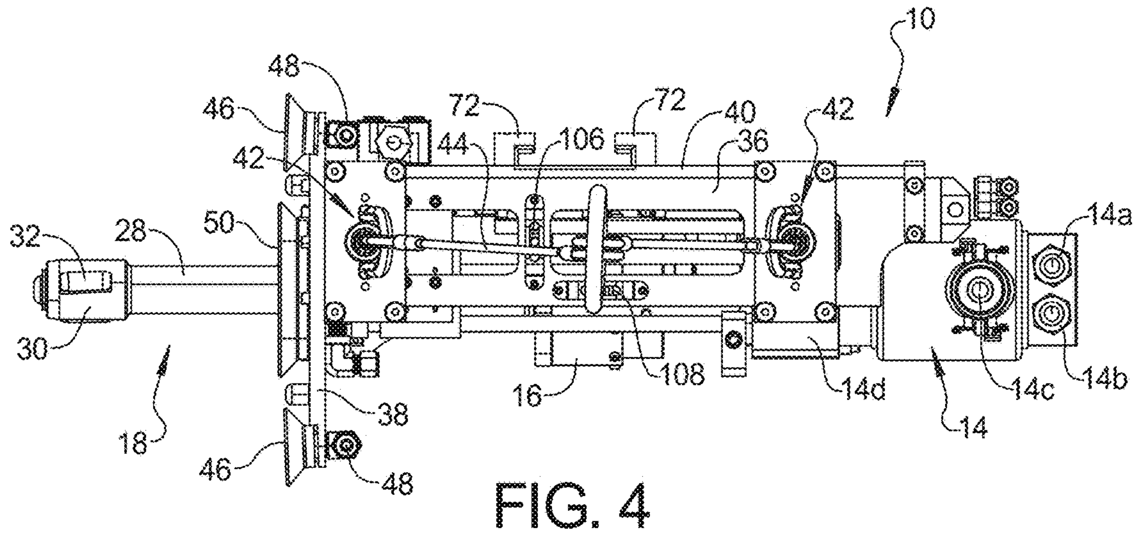
FIG. 4 is a top plan view of the nozzle expansion tool.
Figure 9:
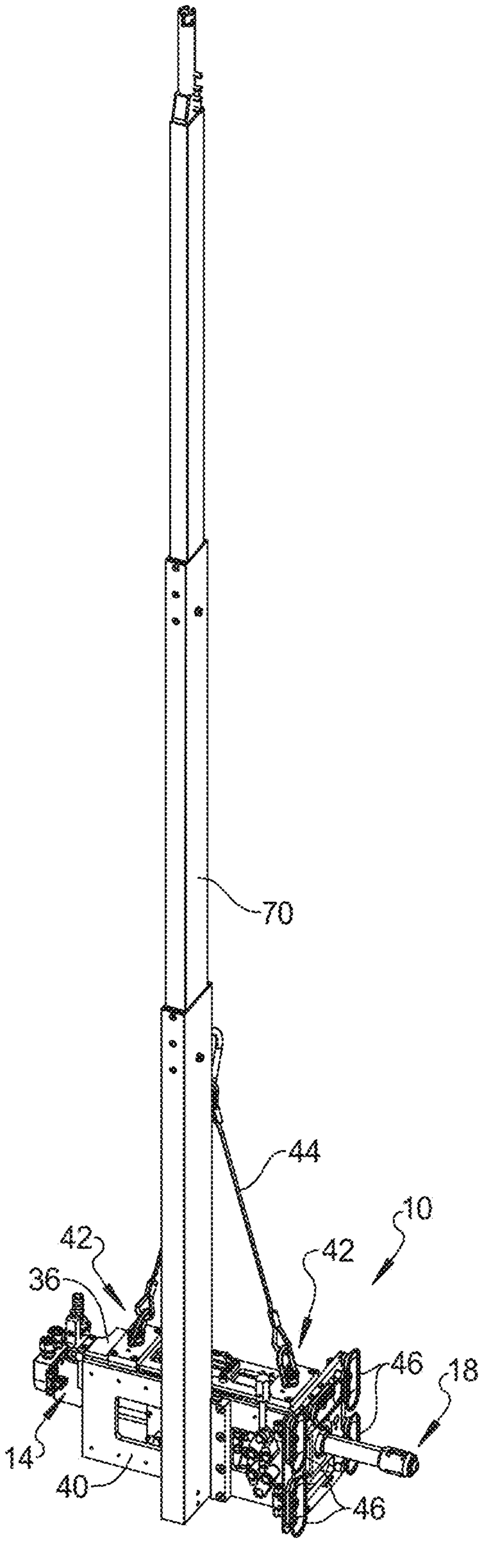
FIG. 9 is a side perspective view of the nozzle expansion tool with a reaction beam attached thereto.

With reference to FIG. 9, a telescoping reaction pole 70 can be connected to the side frame member 40 and can be used for guiding the nozzle expansion tool 10 into place from above the reactor pressure vessel RPV. As shown in FIGS. 4 and 8, the side frame member 40 can include a pair of mounting members 72 for receiving the reaction pole 70. The reaction pole 70 is used to counteract the rotary force applied to the nozzle expansion tool 10 during the nozzle expansion operation. The nozzle expansion tool 10 can be suspended by a hoist (not shown) that is connected to the cable 44.

With reference to FIG. 8, a mandrel support housing 74 is received in an opening 76 in the front frame member 38 and rotatably supports the elongated sleeve 28 of the expansion roller device 18 via a bearing 78. A threaded shaft collar 80 can be received on a threaded end of the elongated sleeve 28 which supports the bearing 78 along with a raised shoulder 82 on the elongated sleeve 28. The mandrel support housing 74 is supported by a carriage 84 that is axially movable in a fore and aft direction by a depth adjustment mechanism 86.

Figure 6:
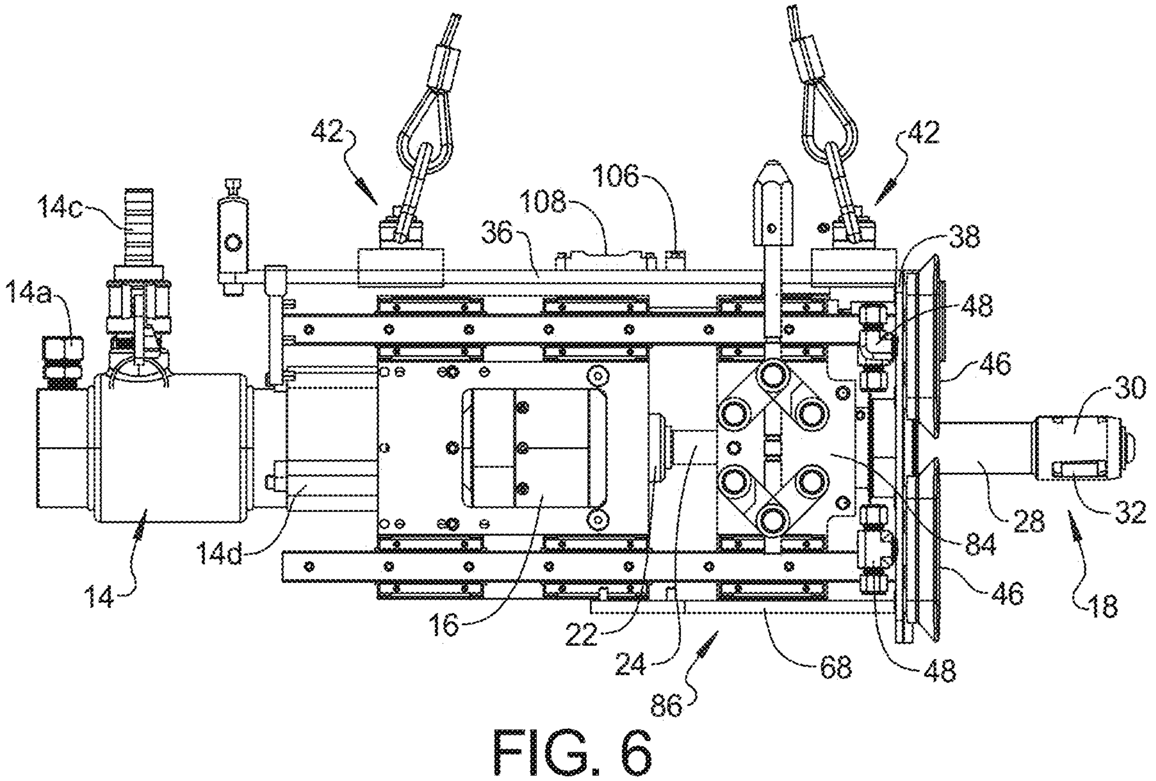
FIG. 6 is a right side plan view of the nozzle expansion tool with the tool head located in an intermediate position and the side frame removed for illustrative purposes.
Figure 7:
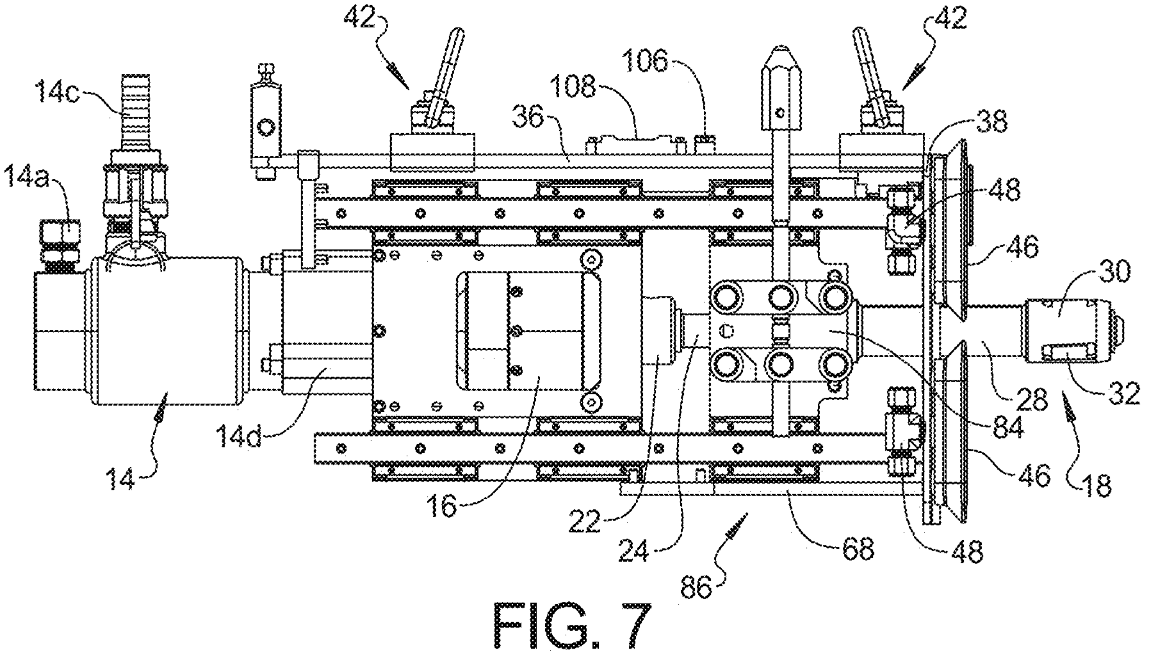
FIG. 7 is a right side plan view of the nozzle expansion tool with the tool head located in a fully retracted position and the side frame removed for illustrative purposes.

The depth adjustment mechanism 86, as best shown in FIGS. 5-7, includes a pair of linkages each including a first link arm 88 fixed to the side frame member 40 by a pivot pin 90 at a first end and connected to a threaded adjustment rod 92 via an adjustment pin 94 at a second end. A second link arm 96 is connected to the adjustment pin 94 at a first end and includes a second end connected to a drive pin 98 that is connected to the carriage 84. The depth adjustment mechanism 86 can be adjusted by clockwise or counter-clockwise rotation of the threaded adjustment rod 92. A tool engagement adapter 100 is mounted to the threaded adjustment rod 92 and can be engaged by a rotary tool to adjust the depth adjustment mechanism 86 by causing the adjustment pins 94 of the upper and lower linkages to move toward or away from one another.

In FIG. 5, the depth adjustment mechanism 86 is shown with the expansion roller device 18 in a furthest forward position relative to the front frame member 38. In FIG. 6, the depth adjustment mechanism 86 is shown with the expansion roller device 18 in an intermediate position relative to the front frame member 38. In FIG. 7, the depth adjustment mechanism 86 is shown with the expansion roller device 18 in a furthest rearward position relative to the front frame member 38. During a nozzle expansion operation, the nozzle expansion tool 10 can be operated with the expansion roller device 18 at each of the different locations.

In operation, a hoist connected to the suspension cable 44 and the reaction pole 70 are utilized to lower and guide the nozzle expansion tool 10 into a reactor pressure vessel RPV and the vacuum cup 50 is operated to guide and pull the expansion head 30 into an opening of a nozzle N in a sidewall of the reactor pressure vessel RPV. Once the expansion head 30 is fully inserted into the nozzle N, the vacuum cups 46 can be provided with a suction via the vacuum fittings 48 in order to secure and stabilize nozzle expansion tool 10 to the side wall of the reactor pressure vessel RPV. A pair of bubble levels 106, 108 can be mounted to the frame 12 in order to visibly assist in leveling and directing the nozzle expansion tool 10 into place. In addition, the tool locator mechanism 52 can be utilized by expanding the tool locator 52 to an extended position as illustrated in FIG. 2, engaging the vacuum cup 50 to the wall, and retracting the tool locator mechanism 52 in order to pull the nozzle expansion tool 10 toward the wall and inserting the expansion head 30 into the nozzle N.

Once the expansion head 30 is inserted into the nozzle N at a desired depth via adjustment of the depth adjustment mechanism 86, the nozzle expansion tool 10 can be activated by moving the support structure 64 forward and causing the rotary mandrel 24 to contact the expansion rollers 32. Then, the motor 14 is operated by supplying pneumatic or hydraulic fluid to the rotary motor 14 to cause rotation of the expansion head 30 in order to cause a radial force against the rollers 32 while they are rotated within the nozzle N. Rotary motion of the expansion head 30 causes an expansion of the wall of the nozzle N at the desired location in order to repair or mitigate a leak therein.

The nozzle expansion tool 10 is able to be remotely deployed within a reactor pressure vessel RPV and can be utilized to work underwater. The expansion rolling process is intended to be performed until a predetermined torque value is obtained that pursuant to testing, is designed to repair a leak caused by a crack in the nozzle attachment weld. The predetermined torque value can be determined based upon a torque calibration fixture that is used before and after using the tool to ensure that a consistent roll forming torque is applied. The vacuum cups 46, 50 are utilized for stabilizing the nozzle expansion tool 10 during the expansion process.

Figure 10:
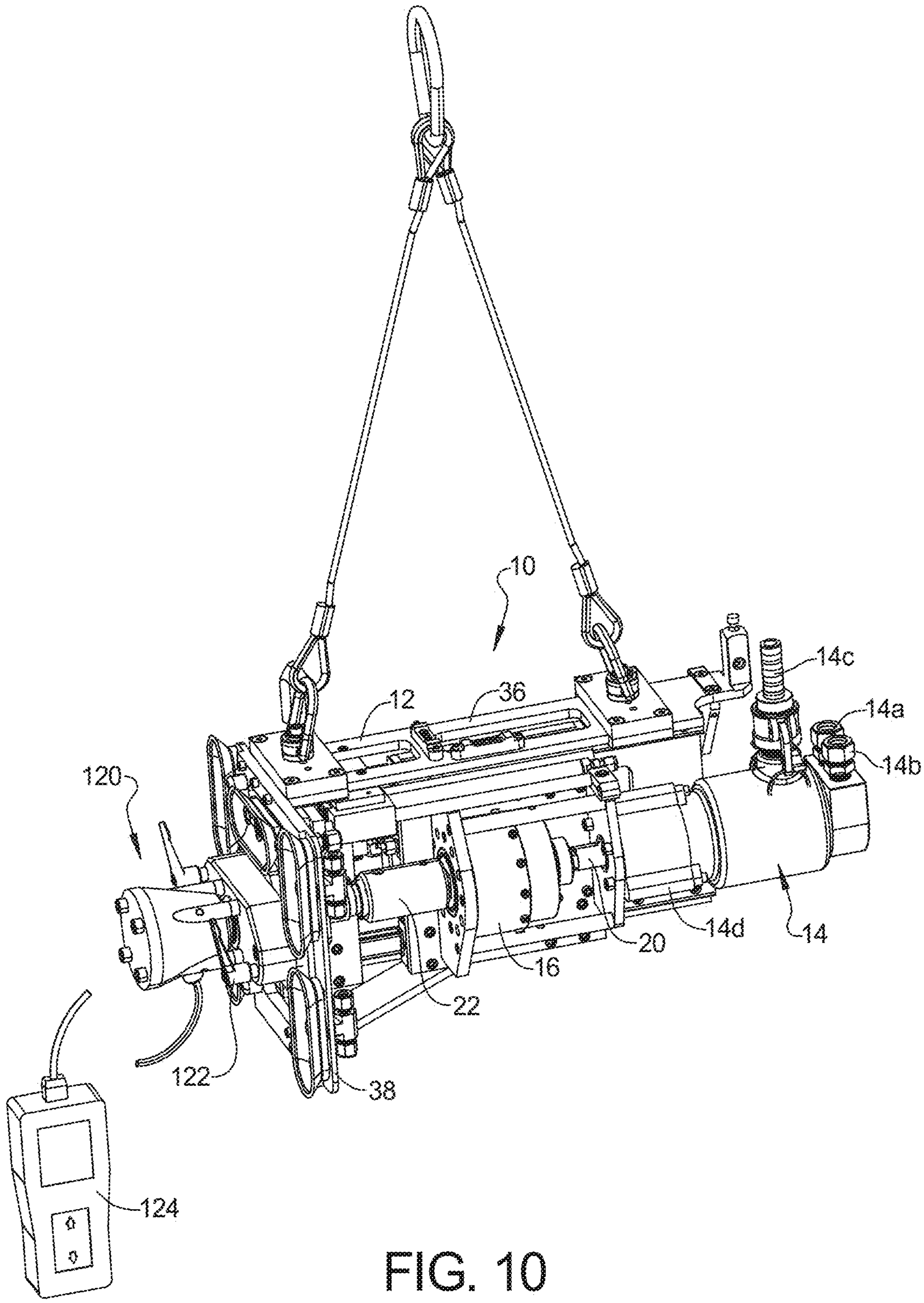
FIG. 10 is a front side perspective view of the nozzle expansion tool connected to a calibration fixture 120 with monitor system 124.
Figure 11:
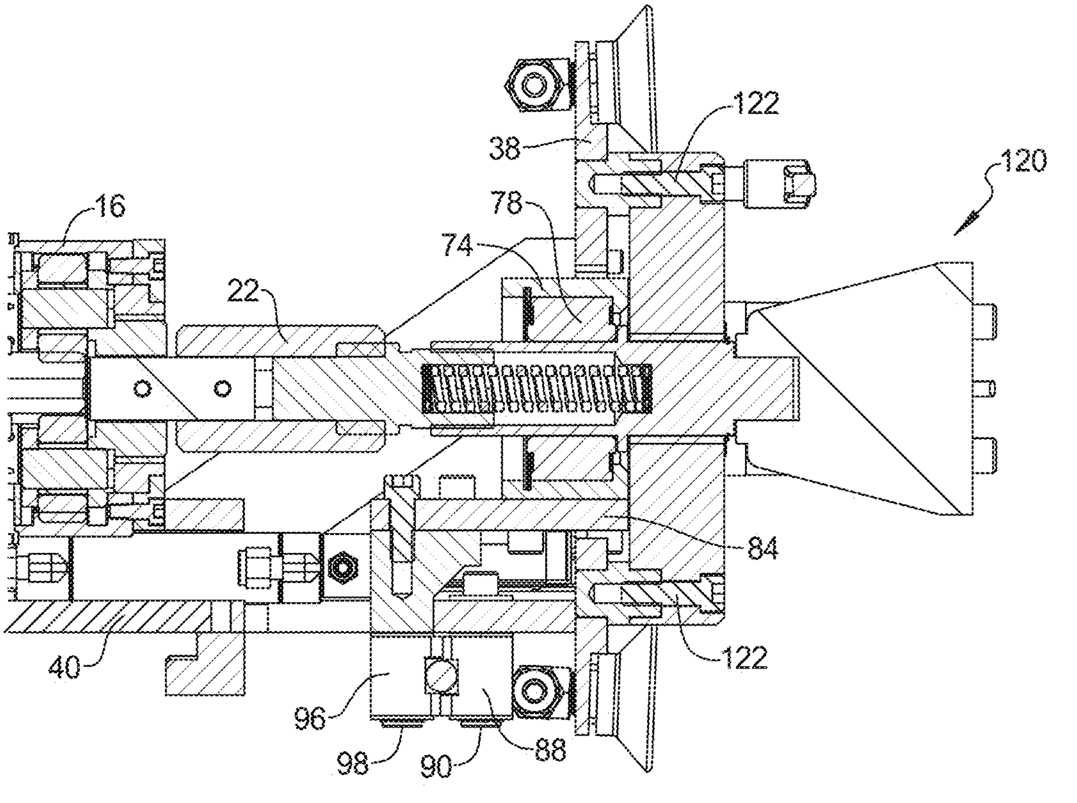
FIG. 11 is a partial cross-sectional view of the nozzle expansion tool connected to a calibration fixture.

With reference to FIGS. 10 and 11, a calibration device 120 is shown connected to the output coupling 22 of the nozzle expansion tool 10. As shown in FIG. 11, the calibration device 120 is fixed to the front frame member 38 by engagement pins 122. As a pneumatic or hydraulic fluid pressure is applied to the drive motor 14, the fluid pressure can be associated with a torque level measured by a strain gauge of the calibration device 120, in order to determine a pressure (psi) vs torque (ft-pounds) characteristic curve for the nozzle expansion tool 10. Accordingly, the nozzle expansion tool 10 can be calibrated before and after tool operation in order to apply a desired torque to the rotary mandrel 24 by supplying the drive motor 14 with an associated pressure during the nozzle expansion tool 10 operation. The calibration of the nozzle expansion tool 10 can also be used to detect damage to the nozzle expansion tool 10. The calibration device 120 can include a monitor system 124 for monitoring the torque level along with the fluid pressure level.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A nozzle expansion tool, comprising:

a frame;

a drive system on the frame;

a rotary mandrel drivingly connected to the drive system;

an expansion roller device engageable by the rotary mandrel;

a first plurality of vacuum cups mounted to a front end of the frame and each including a vacuum fitting configured to connect to a vacuum source; and an additional vacuum cup supported by an extension system that is extendable and retractable relative to the first plurality of vacuum cups, the additional vacuum cup including a vacuum fitting configured to connect to the vacuum source.

2. The nozzle expansion tool according to claim 1, further comprising at least one bumper stop extending from a front face of the frame.

3. The nozzle expansion tool according to claim 1, further comprising a depth adjustment mechanism connected to the expansion roller device and configured to adjust a distance that the expansion roller device extends from the frame.

4. The nozzle expansion tool according to claim 3, wherein the depth adjustment mechanism includes a mandrel support housing rotatably supporting the mandrel and axially movable relative to the frame.

5. The nozzle expansion tool according to claim 4, wherein the depth adjustment mechanism includes a linkage system adjustable by a threaded rod to extend and retract a position of the mandrel support housing relative to the frame.

6. The nozzle expansion tool according to claim 1, wherein the drive system includes one of a pneumatic and a hydraulic motor.

7. The nozzle expansion tool according to claim 1, wherein the drive system is supported by a support structure that is movable in a fore and aft direction relative to the frame.

8. A nozzle expansion tool, comprising:
- a frame;
- a drive system on the frame;
- a rotary mandrel drivingly connected to the drive system;
- an expansion roller device extending from the frame and engageable by the rotary mandrel; and
- a depth adjustment mechanism connected to the expansion roller device and configured to adjust a distance that the expansion roller device extends from the frame, wherein the depth adjustment mechanism includes a mandrel support housing rotatably supporting the mandrel and axially movable relative to the frame, wherein the depth adjustment mechanism includes a linkage system adjustable by a threaded rod to extend and retract a position of the mandrel support housing relative to the frame.

9. The nozzle expansion tool according to claim 8, further comprising:
- a plurality of vacuum cups mounted to the frame and each including a vacuum fitting configured to connect to a vacuum source and an additional vacuum cup supported by an extension system that is extendable and retractable relative to a forward end of the frame.

10. The nozzle expansion tool according to claim 8, wherein the drive system includes one of a pneumatic and a hydraulic motor.

11. The nozzle expansion tool according to claim 8, wherein the drive system is supported by a support structure that is movable in a fore and aft direction relative to the frame.

12. The nozzle expansion tool according to claim 8, further comprising a reaction pole connected to the frame.

13. A nozzle expansion tool, comprising:
- a frame;
- a drive system on the frame;
- a rotary mandrel drivingly connected to the drive system;
- an expansion roller device extending from the frame and engageable by the rotary mandrel, the expansion roller device including an expansion head supporting a plurality of expansion rollers, wherein the rotary mandrel includes a tapered exterior surface that engages the plurality of expansion rollers;
- a depth adjustment mechanism connected to the expansion roller device and configured to adjust a distance that the expansion roller device extends from the frame, wherein the drive system is supported by a support structure that is movable in a fore and aft direction relative to the frame; and
- a plurality of vacuum cups mounted to the frame and each including a vacuum fitting configured to connect to a vacuum source and an additional vacuum cup supported by an extension system that is extendable and retractable relative to a forward end of the frame.

14. The nozzle expansion tool according to claim 13, wherein the drive system includes one of a pneumatic and a hydraulic motor.

15. The nozzle expansion tool according to claim 13, further comprising a reaction pole connected to the frame.

* * * * *